United States Patent
Lin

(10) Patent No.: US 9,574,634 B2
(45) Date of Patent: Feb. 21, 2017

(54) DAMPER FOR A CUTTING TOOL

(71) Applicant: Monkula Enterprise Co., Ltd., Taichung (TW)

(72) Inventor: Kuo-Chi Lin, Taichung (TW)

(73) Assignee: MONKULA ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 14/725,988

(22) Filed: May 29, 2015

(65) Prior Publication Data
US 2016/0348746 A1  Dec. 1, 2016

(51) Int. Cl.
*F16F 7/00* (2006.01)
*F16F 7/10* (2006.01)

(52) U.S. Cl.
CPC ..................... *F16F 7/10* (2013.01)

(58) Field of Classification Search
CPC .................................................. B23B 29/022
USPC ...... 188/322.5, 379; 267/137, 140; 408/143; 173/162.1, 211
See application file for complete search history.

(56) References Cited

U.S. PATENT DOCUMENTS

| | | | | |
|---|---|---|---|---|
| 2,267,143 | A * | 12/1941 | Soldan | B07B 1/42 209/366.5 |
| 3,559,512 | A * | 2/1971 | Aggarwal | B23B 29/022 188/322.5 |
| 4,385,665 | A * | 5/1983 | Knoll | B25D 17/24 173/162.1 |
| 5,413,318 | A * | 5/1995 | Andreassen | B23B 29/022 173/211 |
| 7,661,912 | B2 * | 2/2010 | Onozuka | B23B 29/022 188/322.5 |
| 8,371,776 | B2 * | 2/2013 | Lin | B23B 27/002 408/143 |
| 2003/0147707 | A1 * | 8/2003 | Perkowski | B23B 29/022 407/30 |
| 2007/0089574 | A1 * | 4/2007 | Murakami | B23B 27/002 82/158 |

* cited by examiner

*Primary Examiner* — Christopher Schwartz

(57) ABSTRACT

A damper includes a cylinder, cores and covers. The cylinder includes eccentric bores each confined in a wall formed with a thick portion and a thin portion located opposite to the thick portion. The thick portions of the eccentric bores are located on different sides of the cylinder. Each core is inserted in a corresponding eccentric bore. The covers close the eccentric bores to keep the cores in the eccentric bores. The cores are made with a volume smaller than that of the eccentric bores. The cores are separated from each other. The cores exert forces on the walls of the eccentric bores because of inertia to alleviate vibration of the cylinder.

8 Claims, 4 Drawing Sheets

DAMPER FOR A CUTTING TOOL

BACKGROUND OF THE INVENTION

Field of Invention

The present invention relates to a cutting tool and, more particularly, to a damper for a cutting tool.

Related Prior Art

Vibration is closely related to our everyday. Pleasant music or annoying nose is caused by vibration.

In many devices, there are a stationary element and a rotational element. For example, in a motor, a shell is a stationary element and a mandrel is a rotational element. In a washing machine, a shell is a stationary element, and a drum is a rotational element. In a cutting operation, a blade is held still and a work-piece is rotated. In another cutting operation, a work-piece is held still and a blade is rotated. There is transfer of energy between the rotational elements and the stationary elements, and vibration occurs. Vibration is characterized by two properties, i.e., frequency and amplitude. Resonation occurs when resonation the natural frequency of vibration is identical to the frequency of stimulation. Resonation causes excessive deformation and failure of a mechanical system.

To suppress vibration, there are dampers. A damper can be used in a stationary element such as a column or a beam of a building to suppress vibration of the building caused by an earthquake. A damper can be used in a movable element such as a drill or blade of a cutting tool to suppress the vibration of the cutting tool in operation.

Japanese Patent Application Publication No. 2003-136301 discloses a cutting tool including a blade attached to a front end of a shank. A deep hole is defined in the shank. The deep hole includes an open end at a rear end of the shank and a closed end near the front end of the deep hole. A damper is inserted in the deep hole, adjacent to the blade. A super hard core is inserted in the deep hole, behind the camper.

Japanese Patent Application Publication No. 1994-31507 discloses a cutting tool including a shank. Viscous fluid and a balancing block are introduced into a deep hole defined in the shank.

Japanese Patent Publication No. 2979823 discloses a helical spring inserted in a deep hole defined in a shank of a cutting tool and a viscous elastic material provided between the helical spring and a closed end of the deep hole. A blade is attached to the helical spring. A frictional, vibration-absorbing material is provided between the blade and the shank for transforming vibration into heat that can be dissipated, thus reducing the vibration.

In each of the foregoing references, it is difficult to make the deep hole in the shank where the external diameter of the shank is small. It requires a deep-hole drill to make the deep hole in the shank, and this is expensive. Moreover, the deep hole compromises the strength of the shank. Moreover, the structure is complicated and entails a high cost.

Japanese Patent Application Publication No. 1994-31505 discloses a shank including a bore defined therein for connecting a damper made of a different material. Friction between the shank and the damper reduces the vibration.

Japanese Patent Application Publication Nos. 2001-96403 and 2003-62703 both disclose a damping material introduced into a bore defined in a shank of a cutting tool. The damping material absorbs the energy of the vibration, thus reducing the vibration. In addition to the foregoing problems, these references involve the use of the damping material including Mn—Cu alloys that are often expensive and cannot be fabricated easily. Therefore, it is difficult to reach a high performance at a low cost according to these references.

Japanese Patent Application Publication No. 2005-177973 is intended to provide a cutting tool with excellent damping at a low cost by making a polygonal pocket in a shank of a cutting tool, inserting a damper in the pocket and closing the pocket with a cover, thus keeping the damper in the pocket. The damper can be strip-like, cylindrical or polygonal. The damper is not connected to the shank, with a gap between them. During an operation of cutting a work piece with the cutting tool, the damper alternatively hits different portions of the wall of the pocket because of inertia, thus reducing vibration. The effect of the reduction of the vibration depends upon the gap. The effect of the reduction of the vibration is poor if the gap is too small or too big. It is however difficult to keep the gap within an appropriate range.

As disclosed in U.S. Pat. No. 8,371,776, a cutting tool 100 includes a blade unit, a shank 20 and a damper 30. The blade unit includes a seat 10 and a blade 12. The seat 10 includes a shank-connecting portion 11 and a blade-connecting portion 14. A thread 13 is formed on the shank-connecting portion 11 of the seat 10. The shank 20 includes a thread 22 formed on the wall of a pocket 21. The damper 30 includes a rod 31, a thread 32 formed on the periphery of the rod 31, and a groove 33 made in an end of the rod 31. The damper 30 is inserted in the pocket 21 before the thread 13 is engaged with the thread 22 so that the damper 30 is kept in the pocket 21. There is another gap between another end of the damper 30 and the shank-connecting portion 11. There is a gap between an end of the damper 30 and a closed end of the pocket 21. There is a gap between the threads 32 and 22. The effect of this damper 30 is however unsatisfactory.

The present invention is therefore intended to obviate or at least alleviate the problems encountered in prior art.

SUMMARY OF INVENTION

It is the primary objective of the present invention to provide an effective damper for a cutting tool.

To achieve the foregoing objective, the damper includes a cylinder, cores and covers. The cylinder includes eccentric bores each confined in a wall formed with a thick portion and a thin portion located opposite to the thick portion. The thick portions of the eccentric bores are located on different sides of the cylinder. Each core is inserted in a corresponding eccentric bore. The covers close the eccentric bores to keep the cores in the eccentric bores. The cores are made with a volume smaller than that of the eccentric bores. The cores are separated from each other. The cores exert forces on the walls of the eccentric bores because of inertia to alleviate vibration of the cylinder.

The present invention will become clearer in light of the following detailed description of illustrative embodiments of this invention described in connection with the drawings.

BRIEF DESCRIPTION OF DRAWINGS

The present invention will be described in relation to the preferred embodiment with reference to the accompanying drawings wherein.

Figure 1:
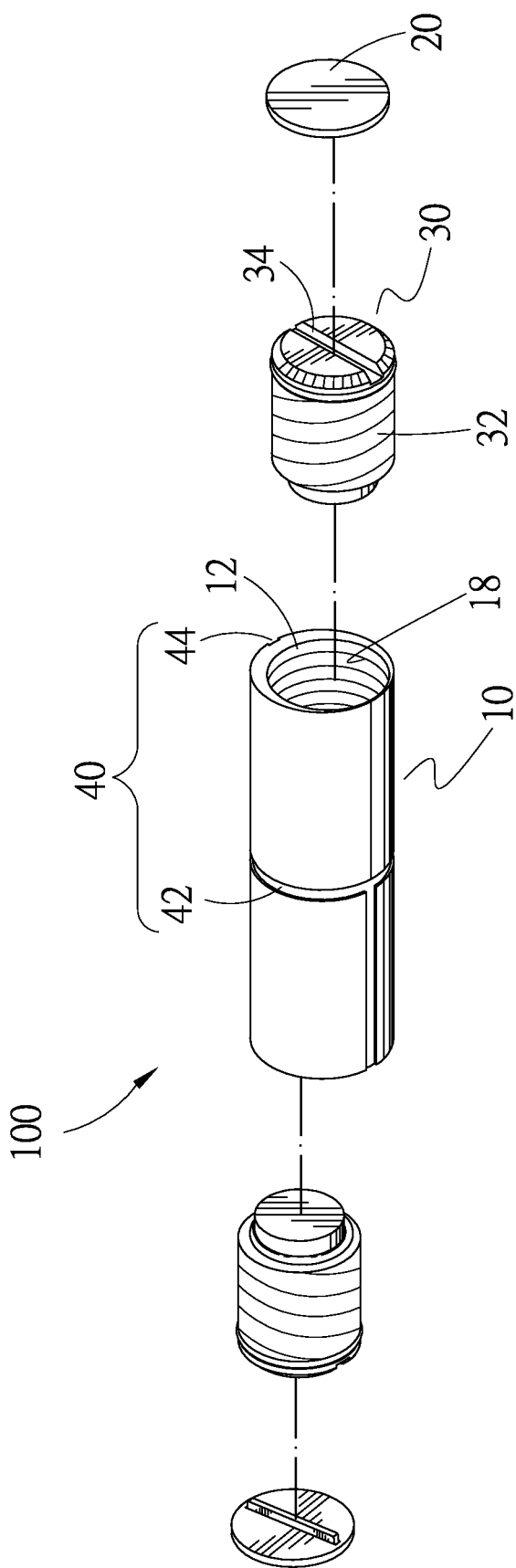
FIG. 1 is an exploded view of a damper according to the preferred embodiment of the present invention.

All figures are drawn only for ease of explanation of the basic teachings of the present invention. The extensions of the figures with respect to number, position, relationship, and dimensions of the parts to form the preferred embodiments will be explained or will be within the skill of the art after the following teachings of the present invention have been read and understood. Moreover, the exact dimensions and dimensional proportions to conform to specific force, weight, strength, and similar requirements will likewise be within the skill of the art after the following teachings of the present invention have been read and understood.

Where used in the drawings, the same numerals designate the same or similar parts. Furthermore, when the terms "first", "second", "lower", "upper", "inner", "outer", "side", "end", "portion", "section", "longitudinal", "axial", "radial", "circumferential", "centrifugal", "lateral", "horizontal", "vertical", "annular", "outward", "inward", "spacing", "clockwise", "counterclockwise", "length", "width", "height", and similar terms are used herein, it should be understood that these terms have reference only to the structure shown in the drawings as it would appear to a person viewing the drawings and are utilized only to facilitate describing the invention.

DETAILED DESCRIPTION OF PREFERRED EMBODIMENT

Referring to FIG. 1, a damper 100 includes a cylinder 10, two identical covers 20 and two identical cores 30 according to the preferred embodiment of the present invention. The cylinder 10 includes a circular periphery extending around an axis 17 referring to FIGS. 3 to 5. The cylinder 10 includes two identical eccentric bores 12. Each eccentric bore 12 is made about an axis 19 biased from the axis 17 of the periphery of the cylinder 10.

Figure 2:
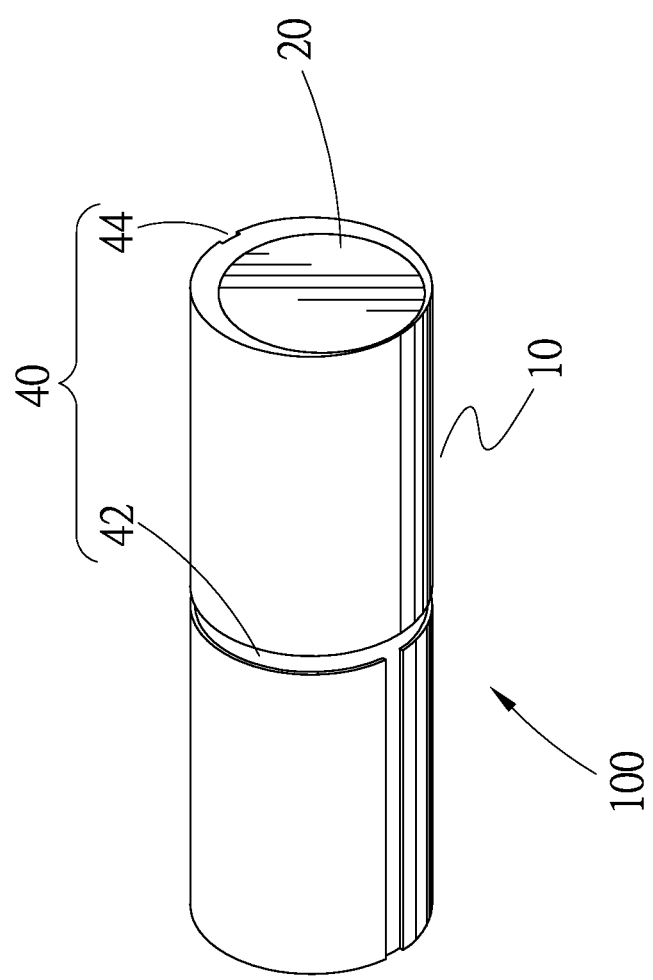
FIG. 2 is a perspective view of the damper shown in FIG. 1.

Referring to FIG. 2, the cores 30 are inserted in the eccentric bores 12 before the eccentric bores 12 are closed by the covers 20. The covers 20 are secured to the cylinder 10 by welding for example so that the cores 30 are kept in the cylinder 10 by the covers 20. Alternatively, the covers 20 can be secured the cylinder 10 by engagement of threads.

Figure 3:
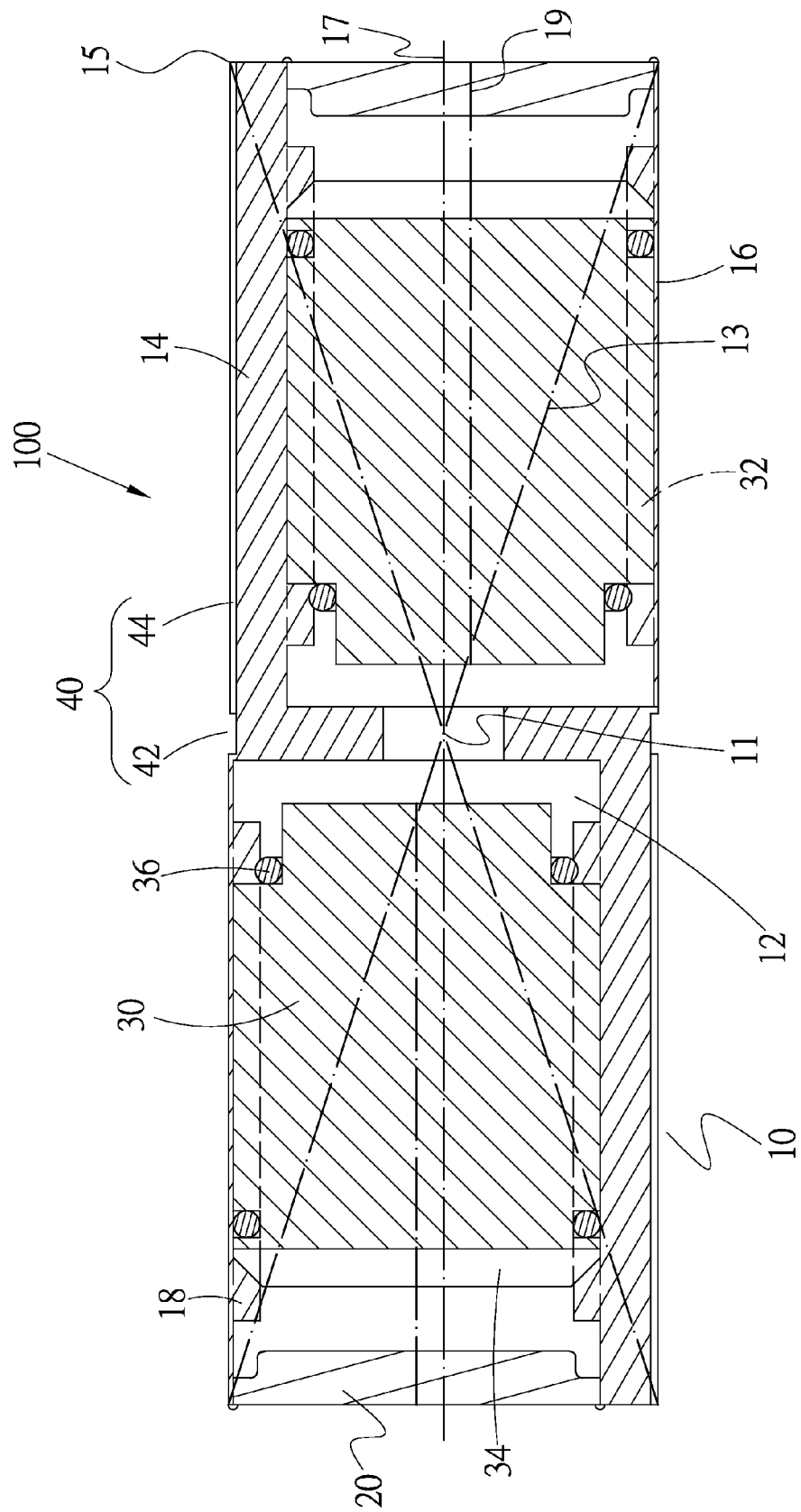
FIG. 3 is a cross-sectional view of the damper shown in FIG. 2.

Referring to FIG. 3, a cross-sectional view of the damper 100, each eccentric bore 12 is made in a wall, a portion of the cylinder 10. The wall of each eccentric bore 12 includes a thick portion 14 and a thin portion 16. The thick portion 14 and the thin portion 16 are located opposite to each other with respect to the axis 19 of each eccentric, i.e., along a diameter of each eccentric bore 12. The thick portion 14 of the wall of one of the eccentric bores 12 is located below the thin portion 16 while the thick portion 14 of the wall of the other eccentric bore 12 is located above the thin portion 16.

That is, in FIG. 3, the cylinder 10 is shaped like a rectangle with two diagonal lines 13 each extending between two corners 15. The diagonal line 13 intersects each other at a point, the center 11 of the cylinder 10. The center 11 is located in the middle of the axis 17 of the periphery of the cylinder 10. The center 11 divides the cylinder into halves, both axially and in a radial direction. One of the halves would overlap the other half if it is rotated for 180°. Hence, the halves are symmetric with respect to the center 11, a reference point.

The cylinder 10 includes a guide unit 40 in the periphery. The guide unit 40 includes an annular groove 42 and two rectilinear grooves 44. The annular groove 42 extends around the periphery of the cylinder 10. Each rectilinear grooves 44 extends in the periphery of the cylinder 10 parallel to the axis 17. However, the rectilinear grooves 44 do not extend along a same line. The annular groove 42 is located between rectilinear grooves 44. Each rectilinear groove 44 includes an end in communication with the annular groove 42 and another end at an end of the cylinder 10. That is, each rectilinear groove 44 includes two open ends. Each thick portion 14 is located closer to the thick portion 14 of a corresponding eccentric bore 12 than the thin portion 16.

In use, the damper 100 is inserted in a cutting tool not shown for example. The guide unit 40 guides coolant to a portion of a work-piece that is being cut by the cutting tool. Thus, the coolant cools the portion of the work-piece and washes away debris caused by the cutting. The guide unit 40 is preferred, but not necessary for the damper 100.

Each core 30 includes a thread 32 formed on the periphery and a driver-connecting portion 34 formed at an end. The driver-connecting portion 34 is preferably a rectilinear groove for receiving a flat tip of a screwdriver not shown. The driver-connecting portion 34 can be a cruciform recess for receiving a cruciform tip of a screwdriver. The screwdriver is operable to drive the cores 30 into the eccentric bores 12 of the cylinder 10, i.e., bring the threads 32 into engagement with the threads 18.

There is a gap not numbered between the threads 18 and 32. That is, the axis 19 of each eccentric bore 12 is marginally biased from the axis of the corresponding core 30. In addition, the capacity of the eccentric bores 12 is larger than the volume of the cores 30. In specific, the length of the eccentric bores 12 is larger than that of the cores 30 and the diameter of the eccentric bores 12 is larger than that of the cores 30. Thus, the cores 30 are not firmly held in position in the eccentric bores 12 of the cylinder 10. That is, the cores 30 are movable in the eccentric bores 12 within a small range.

Figure 5:
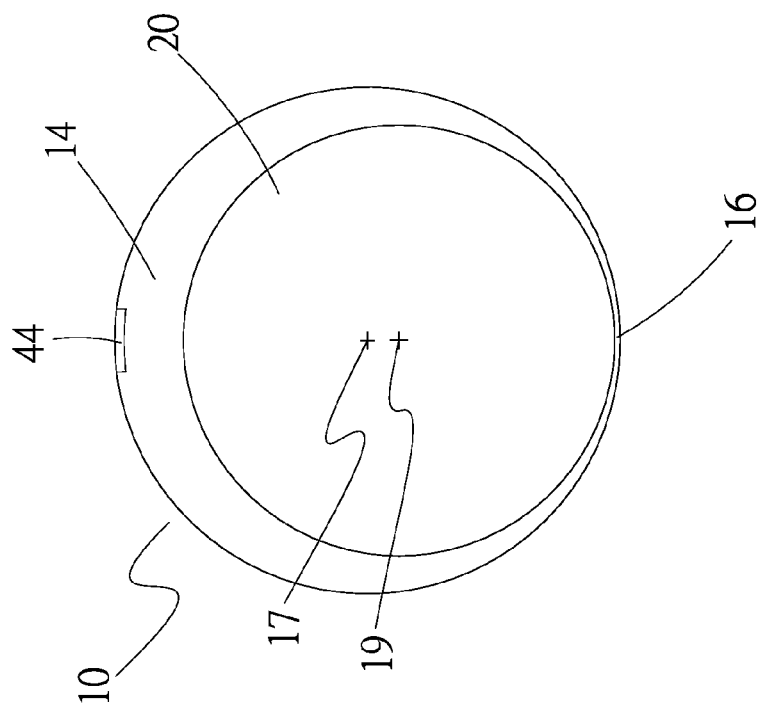
FIG. 5 is a right side view of the damper shown in FIG. 3.
Figure 4:
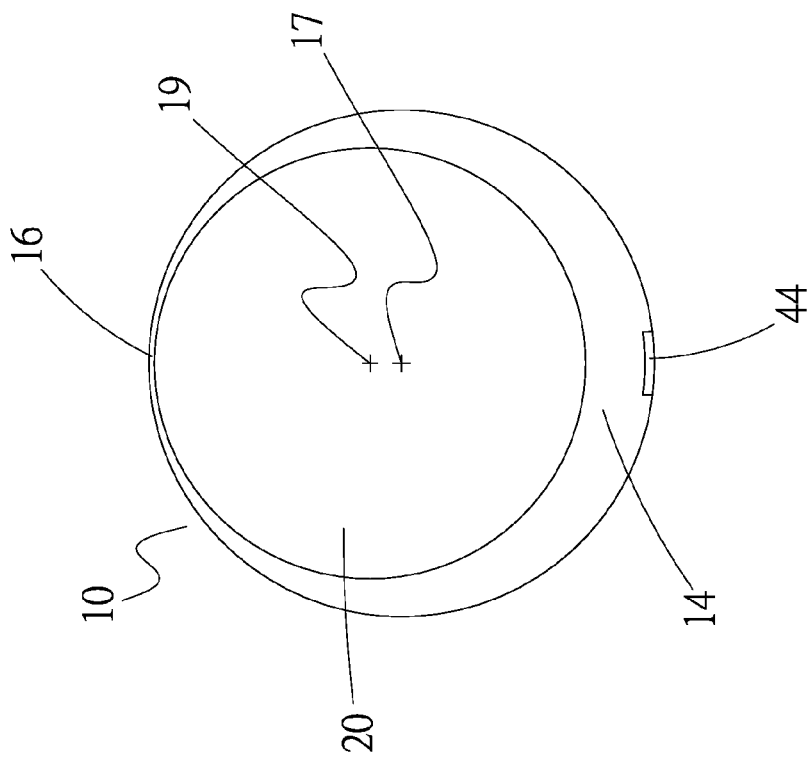
FIG. 4 is a left side view of the damper shown in FIG. 3.

Referring to FIGS. 3 to 5, the cylinder 10 is subject to forces and vibrates. The inertia of the cores 30 causes the cores 30 to hit and hence exert forces on the walls of the eccentric bores 12 of the cylinder 10, thus alleviating the vibration of the cylinder 10 and the entire damper 100. The feature that the axes of the cores 30 are biased from the axis 17 of the periphery of the cylinder 10 facilitates the alleviation of the vibration.

It should be noted that the cores 30 are used with elastic elements 36. Each elastic element 36 is an annular element provided around a corresponding core 30. Preferably, each elastic element 36 is provided around a reduced end of the corresponding core 30. The reduced end of each core 30 is clear of the thread 32. Each elastic element 36 is in contact with a corresponding thread 18. Each elastic element 36 is located at the crest or root of the corresponding thread 18.

During the vibration of the cylinder 10, the core 30 reciprocates both along a diameter of the cylinder 10 and the axis 17. Thus, the elastic elements 36 are deformed by the cores 30 moving towards the threads 18 and accumulate a restoring (or "elastic") force for returning the elastic elements 36 into the original position. Once the cores 30 are away from the threads 18 of the cylinder 10, the elastic element 36 elastically exert the restoring force to return the cores 30 into the original position, thus facilitating the alleviation of the vibration of the cylinder 10.

Since the invention disclosed herein may be embodied in other forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A damper comprising:
a cylinder comprising two eccentric bores, wherein the cylinder extends along a primary axis, wherein each of the eccentric bores extends along a secondary axis that extends parallel to the primary axis, and the secondary axes extend on two opposite sides of the primary axis so that each of the eccentric bores comprises a wall formed with a thick portion and a thin portion located opposite to the thick portion in a radial sense of the cylinder, wherein the eccentric bores are located on two opposite sides of a center of the cylinder in an axial sense of the cylinder;
two cores each inserted in a corresponding one of the eccentric bores, wherein the volume of the cores is smaller than that of the eccentric bores, wherein the cores exert forces on the walls of the eccentric bores because of inertia to alleviate vibration of the cylinder; and
two covers for closing the eccentric bores to keep the cores in the eccentric bores.

2. The damper according to claim 1, wherein the cylinder comprises, in an external side, a guide unit comprising two rectilinear grooves and an annular groove located between and in communication with the rectilinear grooves.

3. The damper according to claim 2, wherein each of the rectilinear grooves is located in the vicinity of the thick portion of the wall of a corresponding one of the eccentric bores.

4. The damper according to claim 3, wherein each of the rectilinear grooves comprises an end in communication with the annular groove and another end at an end of the cylinder.

5. The damper according to claim 1, wherein the wall of each of the eccentric bores comprises a thread, wherein each of the cores comprises a thread in slack engagement with the thread of the wall of the corresponding eccentric bore to alleviate vibration of the cylinder.

6. The damper according to claim 5, wherein each of the cores comprises a driver-connecting portion at an end located near the corresponding cover.

7. The damper according to claim 1, comprising elastic elements each provided between a corresponding one of the cores and the wall of a corresponding one of the eccentric bores.

8. The damper according to claim 7, wherein each of the elastic elements is an annular element provided around the corresponding core.

\* \* \* \* \*